(12) United States Patent
Chheda et al.

(10) Patent No.: US 10,797,964 B2
(45) Date of Patent: Oct. 6, 2020

(54) SYSTEM EVENT NOTIFICATION SERVICE

(71) Applicant: Amazon Technologies, Inc., Seattle, WA (US)

(72) Inventors: Mahendra Manshi Chheda, Sammamish, WA (US); Ramanuja Atur, Seattle, WA (US); Suvenderan Pillay, Cape Town (ZA); Daine Mamacos, Cape Town (ZA); Diwaker Chakravarthy, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 155 days.

(21) Appl. No.: 15/361,414

(22) Filed: Nov. 26, 2016

(65) Prior Publication Data
US 2018/0152358 A1 May 31, 2018

(51) Int. Cl.
| H04L 12/24 | (2006.01) |
| H04L 12/911 | (2013.01) |
| H04L 29/08 | (2006.01) |
| G06F 11/30 | (2006.01) |
| G06F 11/07 | (2006.01) |
| G06F 21/32 | (2013.01) |
| G06F 11/34 | (2006.01) |
| G06F 11/32 | (2006.01) |

(52) U.S. Cl.
CPC ........ *H04L 41/5009* (2013.01); *G06F 11/079* (2013.01); *G06F 11/0793* (2013.01); *G06F 11/302* (2013.01); *G06F 11/3048* (2013.01); *G06F 11/3055* (2013.01); *G06F 11/323* (2013.01); *G06F 11/3438* (2013.01); *G06F 21/32* (2013.01); *H04L 47/70* (2013.01); *H04L 67/16* (2013.01)

(58) Field of Classification Search
CPC . H04L 41/5096; H04L 43/0817; H04L 47/70; H04L 63/1425; H04L 63/1416; H04L 67/10; G06F 11/079; G06F 11/302; G06F 11/0751; G06F 11/0793; G06F 11/3048; G06F 11/3055; G06F 11/323; G06F 11/3433; G06F 11/3438; G06F 21/32; G06F 21/566; G06F 2201/86; G06F 2201/875
USPC ........................................................ 709/224
See application file for complete search history.

(56) References Cited

U.S. PATENT DOCUMENTS

| 8,832,268 B1 * | 9/2014 | Chheda ............... H04L 43/0817 705/7.22 |
| 9,128,773 B2 * | 9/2015 | Beaty .................... G06F 9/5083 |

(Continued)

OTHER PUBLICATIONS

International Search Report and Written Opinion dated Mar. 5, 2018, International Patent Applicaiton No. PCT/US2017/062865, filed Nov. 21, 2017, 14 pages.

Primary Examiner — Ruolei Zong
(74) Attorney, Agent, or Firm — Davis Wright Tremaine LLP

(57) ABSTRACT

A system event notification service detects that an event has occurred that impacts infrastructure of a computing resource service. In response to the event, the service identifies a customer account that is impacted by the event. The service generates, for the customer account, event data corresponding to a plurality of computing resources impacted by the event. The service provides the event data in accordance with one or more preferences specified in the customer account.

20 Claims, 10 Drawing Sheets

(56) References Cited

U.S. PATENT DOCUMENTS

| | | | | |
|---|---|---|---|---|
| 9,170,951 | B1* | 10/2015 | He | G06F 12/0844 |
| 9,836,342 | B1* | 12/2017 | Mahapatra | G06F 11/0769 |
| 2005/0216766 | A1* | 9/2005 | Cornpropst | G06F 21/62 |
| | | | | 726/5 |
| 2006/0248407 | A1 | 11/2006 | Adams et al. | |
| 2007/0224978 | A1* | 9/2007 | Wherry | H04L 51/04 |
| | | | | 455/414.2 |
| 2015/0135312 | A1* | 5/2015 | Wada | G06F 11/3495 |
| | | | | 726/22 |
| 2015/0326522 | A1* | 11/2015 | Pu | G06F 21/6245 |
| | | | | 726/26 |
| 2016/0224400 | A1 | 8/2016 | Shafique et al. | |
| 2017/0195265 | A1* | 7/2017 | Billi | H04L 51/046 |
| 2017/0250857 | A1* | 8/2017 | McCullough | H04L 41/0686 |
| 2017/0250865 | A1* | 8/2017 | McCullough | H04L 41/0816 |

* cited by examiner

System Event Notification Service                                  name@email

| Event Timeline | 502 |
| --- | --- |
| Resource Issues | |
| Service Issues | |
| Scheduled Events | |
| Announcement | |

Custom Groups

Create A Custom Group  504

Group Name: [ my_group_1 ]  506

Account ID: [ my_account ]  508

Region: [ US Midwest ]  510

Event Type: [ Resource Failure ]  512

Resource ID: [ 1908101420161103 ]  514

Tags: [ Production, Test, Web Site ]  516

[ Create Group ] 518    [ Cancel ] 520

System Event Notification Service 602 name@email

Event Timeline
- Resource Issues
- Service Issues
- Scheduled Events
- Announcement

Custom Groups

| Resource Issues | Service Issues | Scheduled Events | Announcements 606 |

604

Actions ▽ 608

| | Event Type | Status | Region | Start Time (GMT) | Service |
|---|---|---|---|---|---|
| ○ | Instance Stor... | Ongoing | US Mid | 11/3/2016 00:47 | VCS |
| ● | Database Fail... | Ongoing | US Mid | 11/3/2016 00:15 | Database |
| ● | Instance Degr... | Ongoing | US Mid | 11/3/2016 00:11 | VCS |
| ● | Server Outage | Ongoing | US Mid | 11/2/2016 20:30 | VCS |

610

Visualization 612 my_application

VCS
US Midwest-1 my_instance
1908101420161103

BFM_instance-VCS
8675309123456789

VCS
US Midwest-2 i-d880645c
2987776540001234

SYSTEM EVENT NOTIFICATION SERVICE

BACKGROUND

Computing resource service providers that operate large networks occasionally experience issues that affect their ability to provide services to some customers. For example, a piece of equipment, such as a server, a network device, or a rack of devices, may malfunction affecting some, but not all customers. At the same time, customers that utilize the services of computing resource service providers often have complex systems in place, often utilizing both resources hosted by the provider as well as resources they host themselves and possibly resources hosted by other providers. Moreover, computing resources hosted and maintained by a computing resource service provider may nevertheless be configured by the customers. A virtual computer system, for example, may run on hardware of a computing resource service provider according to software that is selected and/or provided by the customer.

Such events can cause frustration for the customers of the service provider as they spend resources attempting to determine the cause of a malfunction. Often, information about outages and other events is not sufficiently granular. A computing resource service provider may, for instance, publish information indicating that they are experiencing an operational issue, without indicating specific details about the issue and which customers are effected, leaving customers guessing as to what, if anything, to do as a result of their applications running incorrectly. For example, customers can spend a significant amount of time troubleshooting their own computing resources and infrastructure only to discover that the root cause was a problem with a service provided by a service provider that the customer could have worked around.

BRIEF DESCRIPTION OF THE DRAWINGS

Various techniques will be described with reference to the drawings, in which:

FIG. 5 shows an illustrative example of an interface for generating one or more custom groups for aggregating of event data corresponding to computing resources of the one or more custom groups in accordance with at least one embodiment;

FIG. 6 shows an illustrative example of an interface for reviewing event data for computing resources impacted by computing resources issues, service issues, and scheduled events in accordance with at least one embodiment;

DETAILED DESCRIPTION

Figure 1:
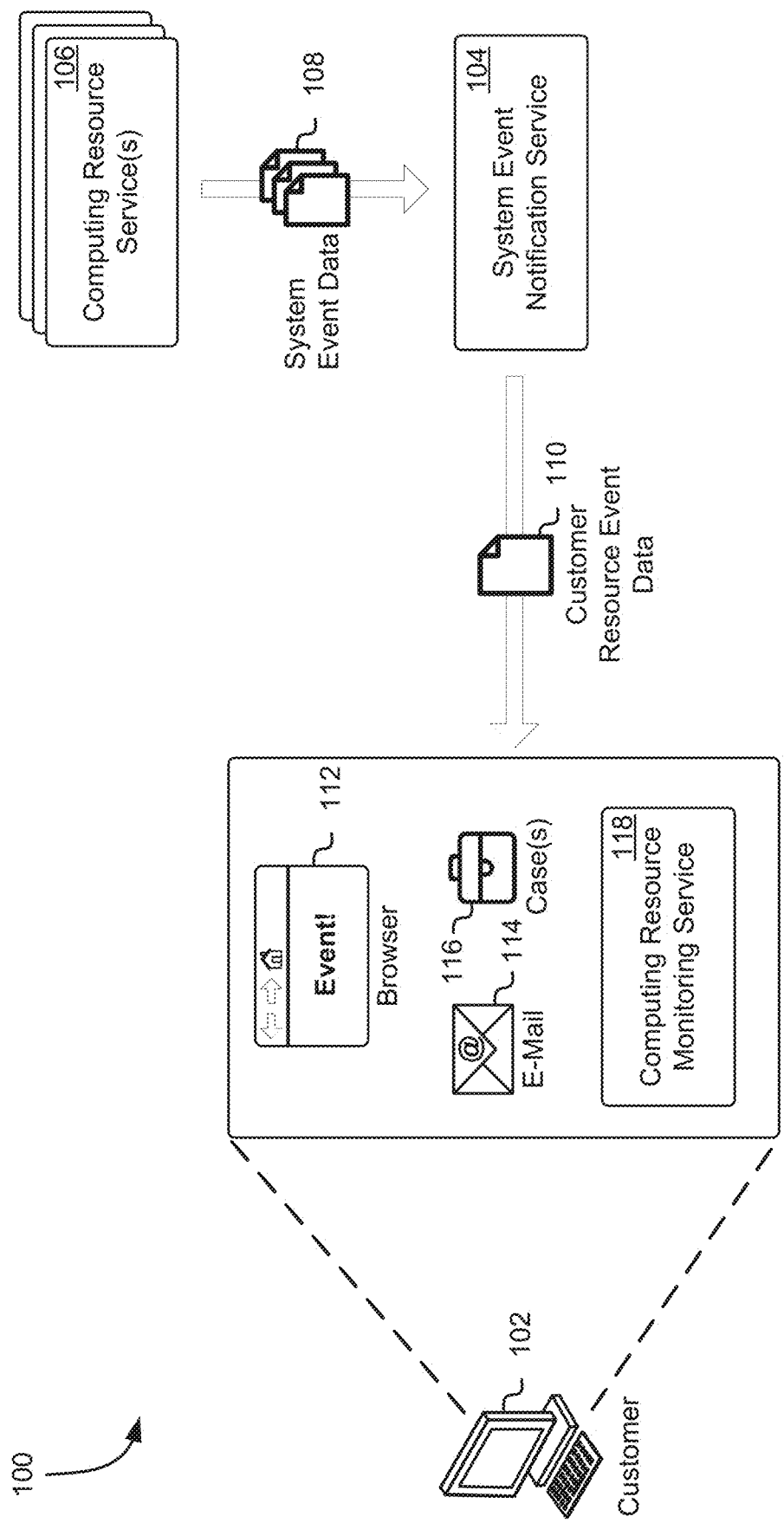
FIG. 1 shows an illustrative example of an environment in which various embodiments can be implemented.

This patent application relates to a system event notification service that can generate customized notifications for events impacting a customer's computing resources provisioned and maintained by a computing resource service provider. In an example, a customer of a computing resource service provider transmits a request to the system event notification service to configure reporting of events that impact the customer's computing resources. In the request, the customer may specify the communications methods to be used by the system event notification service to notify the customer of an event impacting its computing resources. Additionally, the customer may specify that event data corresponding to the event be transmitted to other services, which may perform remedial actions in response to the event on behalf of the customer. For instance, a customer may specify that event data for a particular computing resource be sent to a computing resource monitoring service, which may launch a software container or other set of computing resources to address the event based on the customer's instructions to the computing resource monitoring service. In response to the request, the system event notification service may update the customer's account to configure the various reporting mechanisms specified in the request. Further, the system event notification service may initiate monitoring of event data from the various services of the computing resource service provider for events that may impact the customer's computing resources.

In some examples, the system event notification service can detect events that impact computing resources and services of the computing resource service provider. For instance, the system event notification service may receive a notification that includes event data corresponding to an event from a computing resource service of the computing resource service provider. Alternatively, the system event notification service may monitor the services provided by the computing resource service provider to identify any events impacting the performance of any of these services. If an event is detected, the system event notification system service may query the service to obtain event data corresponding to the event or may generate the event data itself based on the detected event. In response to the event, the system event notification service may identify the customers impacted by the event. For instance, based on the event, the system event notification service may identify the resources impacted by the event. The system event notification service may identify the customers that rely on these impacted resources and obtain event data corresponding to these impacted resources.

For each customer identified, the system event notification service may receive event data corresponding to the customer's impacted computing resources and identify the customer's preferences for disclosure of the event data. In some examples, the system event notification service accesses the customer's account to identify the customer's preferences, which may have been provided in an earlier request. Based on these preferences, the system event notification service may transmit the event data to the customer or to another entity designated by the customer. Alternatively, the customer's account may include an indication that the event data for the customer's computing resources is to be stored by the system event notification service and provided to the customer upon request. If the customer's account includes this indication, the system event notification service may store the event data within its datastores and update the customer's account to indicate availability of this event data for its computing resources. In some instances, the system event notification service may store event data that is transmitted to the customer or other entity based on the customer's preferences specified in its account.

In an example, the system event notification service receives can receive requests from customers of the computing resource service provider to obtain event data for their computing resources. In response to a request from a customer to obtain event data for its computing resources, the system event notification service may access the customer's account to determine whether there is event data available for the computing resources specified in the request. If there is no event data available for the specified computing resources, the system event notification service may transmit a notification to the customer indicating that there is no event data available for the specified computing resources. However, if the system event notification service determines that event data is available for the specified computing resources, the system event notification service may use the customer's account to determine the customer's preferences for presentation of the event data. This may include presentation of the event data via an interface provided by the service to the customer. Alternatively, presentation of the event data may include generating one or more reports that can be transmitted to the customer via electronic mail (e-mail) or using other methods as specified by the customer.

In this manner, the system event notification service provides customized and relevant event data for a customer's computing resources in response to an event impacting services and resources of a computing resource service provider. In addition, the techniques described and suggested in this disclosure enable additional technical advantages. For instance, because the system event notification service evaluates event data from the various services provided by the computing resource service provider to identify, for each customer, event data specific to the customer's computing resources, the system event notification service can provide customized reports to the customer without including extraneous data that may not be useful to the customer. This enables the customer to identify the nature of the event quickly, thus allowing the customer to perform remedial actions necessary to restore functionality of its computing resources and minimize downtime. Additionally, because the system event notification service can provide event data to other services as designated by a customer, the customer can provide instructions to these other services to perform remedial operations on its behalf automatically.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a system event notification service 104 receives, from one or more computing resource services 106 of a computing resource service provider, system event data 108 for the services and infrastructure utilized to operate these services. For instance, each computing resource service may employ monitoring systems that monitor the infrastructure of the service to identify any events as they occur. As an illustrative example, an agent may obtain telemetry data from the physical components of the infrastructure and may evaluate this telemetry data to identify issues with any of the components of the infrastructure, the connections among these components and to other networks, and the like. In some examples, monitoring is performed by agents that may be software applications configured to run in each computing resource service and may act as an interface between their respective computing resource service and other services and entities, such as the system event notification service 104. Alternatively, a computing resource service may utilize a support team comprising administrators and other authorized entities of the computing resource service that may be tasked to evaluate data from components of the infrastructure of a computing resource service to identify potential issues and events. The support team may generate the system event data 108, which may be transmitted to the system event monitoring service 104.

The infrastructure of a computing resource service may include the infrastructure used to effectuate a service. For example, typically a service is composed of a control plane that coordinates the functionality of the physical components and software which instantiates the service and a data plane, which is composed of servers that store data or run workloads of or for customers. As such, the infrastructure of a service can include physical components, such as servers, racks, routers, switches, network cables, storage devices, power supplies, fans, and the like and the service's software which runs on the physical components. The software provided by the computing resource service provider and installed on one or more of these physical components may run the service and monitor these physical components to identify any issues associated with these physical components and to regulate usage of these physical components. In a specific example, a service which enables customers to launch virtual machines may include infrastructure that effectuates a control plane portion of the service and a data plane. The control plane may include a web server front end for handling requests; a database tier of servers for storing requests; and a processing tier of servers for determining where to place virtual machines on servers in the data plane. These three parts of the control plane may be implemented by a fleet of servers interconnected by routers and network switches and work together to enable customers to launch virtual machines. The data plane may include a fleet of servers operable to host virtual machines. These servers may be aggregated into a rack and the rack may be one of many coupled to network infrastructure of the service provider. All or a portion of these components can include monitoring agents (or be monitored by a monitoring service) and the service provider can employ human agents to operate the infrastructure on behalf of the customers.

Periodically, events occur with the infrastructure that can cause the service to operate at reduced capacity or, in some cases, go down. These events run the gambit: from networking events that cause portions of the network interconnecting the infrastructure components to become unreachable to hardware failures that cause individual servers to crash. When these events occur, the human agents troubleshoot the problems and take actions to bring the service back to full capacity and the human agents (or automated services) report the events and the scope of impact of the events to the system event notification service.

The system event data 108 from the one or more computing resource services 106 may include telemetry data, customer data (e.g., customers for whom a resource is provisioned, etc.), resource usage data (e.g., read/write operations per second, etc.), bandwidth data (e.g., input and output data rates, etc.), security data (e.g., data corresponding to a security breach, data corresponding to security actions, etc.), billing data, and the like. The system event data 108 may also refer to operational events corresponding to the infrastructure of the computing resource services 106 as identified by the one or more computing resource services 106. In some embodiments, the system event notification service 104 monitors the one or more computing resource services 106 to identify any events that may impact the infrastructure of the computing resource services 106. For instance, if the system event notification service 104 determines that a particular server of a computing resource service has been rendered inoperable or is offline, the system event notification service 104 may identify, based at least in part on the configuration of the computing resource service and customer accounts, the impacted computing resources and customers. The system event notification service 104 may also generate its own system event data 108 corresponding to the event.

In response to receiving the system event data 108 from the one or more computing resource services 106, the system event notification service 104 may identify the customers whose computing resources may be impacted by the events detected by the one or more computing resource services 106 or the system event notification service 104. For instance, the system event notification service 104 may store a data store (e.g., a database or data repository) that includes information about the customer accounts of customers that currently have resources in or on the service. The data store can be periodically refreshed by communicating with data stores of the services. This way the system event notification service can be independent from the services in case an event causes servers of the service which store information about customers currently using the services become unavailable. The system event notification service can use the system event data 108 to form queries of its data store to determine customers whose computing resources may be impacted. For example, the system event notification 104 may periodically communicate with a data store of a compute service to identify and store information indicative of all the customers that currently are running virtual machines. In some cases this information may also identify the individual racks and servers the customers are running on. In the event that a notification identifies a rack or server as unavailable, the system event notification can use the stored information to determine the customers potentially impacted by the event. Alternatively, the system event notification service can query an identity management service of the computing resource service provider to identify customers associated with the impacted infrastructure specified in the system event data 108 or otherwise identified by the system event notification service 104. In an alternative example, the system event data 108 from the one or more computing resource services 106 may specify the one or more customers impacted by the identified event. For instance, the aforementioned agents may identify the customers that utilize the impacted computing resources and may append the system event data 108 to include information regarding these customers (e.g., customer identifiers, contact information, etc.). In some embodiments, the system event notification service 104 accesses one or more resource mapping databases to identify, based at least in part on a mapping of computing resources and the infrastructure of the one or more computing resource services, the customers that may be impacted by a particular event. Based at least in part on the customer information obtained through the system event data 108 or from an identity management service, the system event notification service 104 may generate customer resource event data 110 for each identified customer. The customer resource event data 110 may include an event identifier corresponding to the detected event, computing resource service information (e.g., availability region and zone of the computing resource service, an identifier for the computing resource service, etc.), the type of event (e.g., scheduled maintenance, resource failure, resource lag, etc.), start and end time for the event, identifiers for computing resources affected (if any), human-readable event messages, remediation steps if applicable, knowledge base articles corresponding to the event, additional metadata corresponding to the event, and the like. The customer 102 may be an individual, organization or automated process that could utilize one or more services 106 provided by the computing resource service provider to operate and manage computing resources to support his or her operations. Further, the customer 102 may utilize the system event notification service 104 as described below.

In an embodiment, the system event notification service 104 utilizes one or more customer accounts of the system event notification service 104 to identify customers impacted by the events specified in the received system event data 108 from the computing resource services 106, as well as customers that have opted to receive information regarding events impacting certain computing resources. For instance, a customer 102 of the computing resource service provider may transmit a request to the system event notification service 104 to configure reporting of event data for the customer's computing resources maintained by the one or more computing resource services 106. The customer 102 may be an individual associated with a customer account of a computing resource service, or may be an individual, system, resource computing device, or other entity authorized to act on behalf of the individual associated with the customer account. In response to the request, the system event notification service 104 may generate or update a customer account for the customer 102 to configure one or more reporting mechanisms for the customer resource event data 110 created by the system event notification service 104.

In its request, the customer 102 may specify one or more push channels for dissemination of customer resource event data 110 generated by the system event notification service 104. For instance, the customer 102 may provide primary and alternate contact information, which can be used to provide the customer resource event data 110. As an example, if a customer 102 provides one or more e-mail addresses for delivery of the customer resource event data 110, the system event notification service 104 may generate, based at least in part on the generated customer resource event data 110, one or more e-mail messages 114 that can be sent to the corresponding e-mail addresses provided by the customer 102. As another example, the customer 102 may request that the customer resource event data 110 be used to generate one or more case files 116, which the system event notification service 104 may transmit to one or more support teams designated by the customer 102 to address any events impacting the customer's computing resources. These case files 116 may be generated using a format understandable by the support team. This format may include human-readable language, programmatic code, and the like.

In an embodiment, the customer 102 can specify, in its request to the system event notification service 104, that the customer resource event data 110 is to be delivered to a computing resource monitoring service 118 of the computing resource service provider. The computing resource monitoring service 118 may be responsible for collecting computing resource data corresponding to computing resources of the one or more computing resource services 106. The computing resource data obtained by the computing resource monitoring service 118 may indicate the utilization of various components of the computing resources such as the central processing unit, memory, networking interface, operating system, applications, and other components of computing resources. This information may be used for a variety of different purposes, for example, determining whether perform one or more remedial actions to address any issues impacting performance of computing resources of the computing resource services 106. Additionally, the information may be used by a maintenance service to determine the health of computing resource. In an embodiment, a customer can transmit instructions to the computing resource monitoring service 118 to launch one or more software containers to perform remedial operations to address issues impacting the customer's computing resources. Thus, the customer 102 may cause the system event notification service 104 to transmit the customer resource event data 110 corresponding to its resources to the computing resource monitoring service 118, which may evaluate the data to determine whether to perform the remedial actions as specified by the customer 102.

The customer 102 may further specify, in its request to the system event notification service 104, other methods for pushing the customer resource event data 110 to the customer 102 or to other entities. For instance, the customer 102 may request that the customer resource event data 110 be transferred to a notification service, which may enable the system event notification service 104 to send notifications including the customer resource event data 110 to large numbers of recipients or other distributed networks through a communications network. The system event notification service 104 may publish the notification through a particular topic created using the notification service. In response to the system event notification service 104 publishing the notification to the topic, the notification may be transmitted to each recipient subscribed to the topic. The system event notification service 104 may add the notification generated in response to generation of the customer resource event data 110 for the customer's computing resource to this topic, which may cause the notification service to transmit the notification to administrators, other computing resource services that may use the data to perform remedial actions, and other recipients which may be subscribed to this particular topic.

In some embodiments, the system event notification service 104 provides one or more pull channels to enable customers to request their customer resource event data 110 from the system event notification service 104. For instance, the system event notification service 104 may provide to the customer 102 an interface, such as a graphical user interface (GUI), that a customer 102 may access through a browser application 112 installed on a computing device, such as a client device. In order for the customer to interact with the system event notification service 104, the customer 102 may provide credential information for authentication through the GUI, whereby the GUI may utilize the provided credential information to authenticate the customer 102. The credential information may include, among other things, a username, a corresponding password, biometric information, a cryptographic key, a unique identifier, a set of credentials, a hash of the set of credentials, a digital signature generated using a credential, a message authentication code generated based at least in part on a credential, and the like. The system event notification service 104 may utilize the obtained credential information from the GUI to authenticate the customer 102.

If the customer 102 is successfully authenticated by the system event notification service 104, the system event notification service 104 may update the GUI to present the customer with options to evaluate any customer resource event data 110 that may be available for the customer's computing resources. For instance, the system event notification service 104 may present, through the GUI, alerts indicating the presence of event data corresponding to the customer's computing resources. The customer 102 may interact with these alerts to cause the GUI to be updated to present detailed event data for the customer's computing resources. Additionally, through the GUI, the customer 102 may view event data for its computing resources according to the event type. For instance, the GUI may be updated to separate event data according to computing resource events, computing resource service events, scheduled events (e.g., maintenance, etc.), and the like. Thus, the customer 102 may know the underlying issue regarding their computing resources through use of the GUI before accessing the detailed event data for its computing resources.

In an embodiment, the system event notification service 104 enables customers to create customized groups for monitoring computing resources. For instance, a customer may create a group in the system event notification service 104 by grouping together an ordering of service regions, computing resource services, tags, and computing resources to denote the customer's applications, projects, cost centers, and the like. These group definitions may be matched with every event published by the one or more computing resource services 106. If a match is identified by the system event notification service 104, the event data corresponding to the event is appended to include metadata comprising the group name, resource tags, and the like. This may provide specificity of impact to the computing resources to the customer 102.

Figure 2:
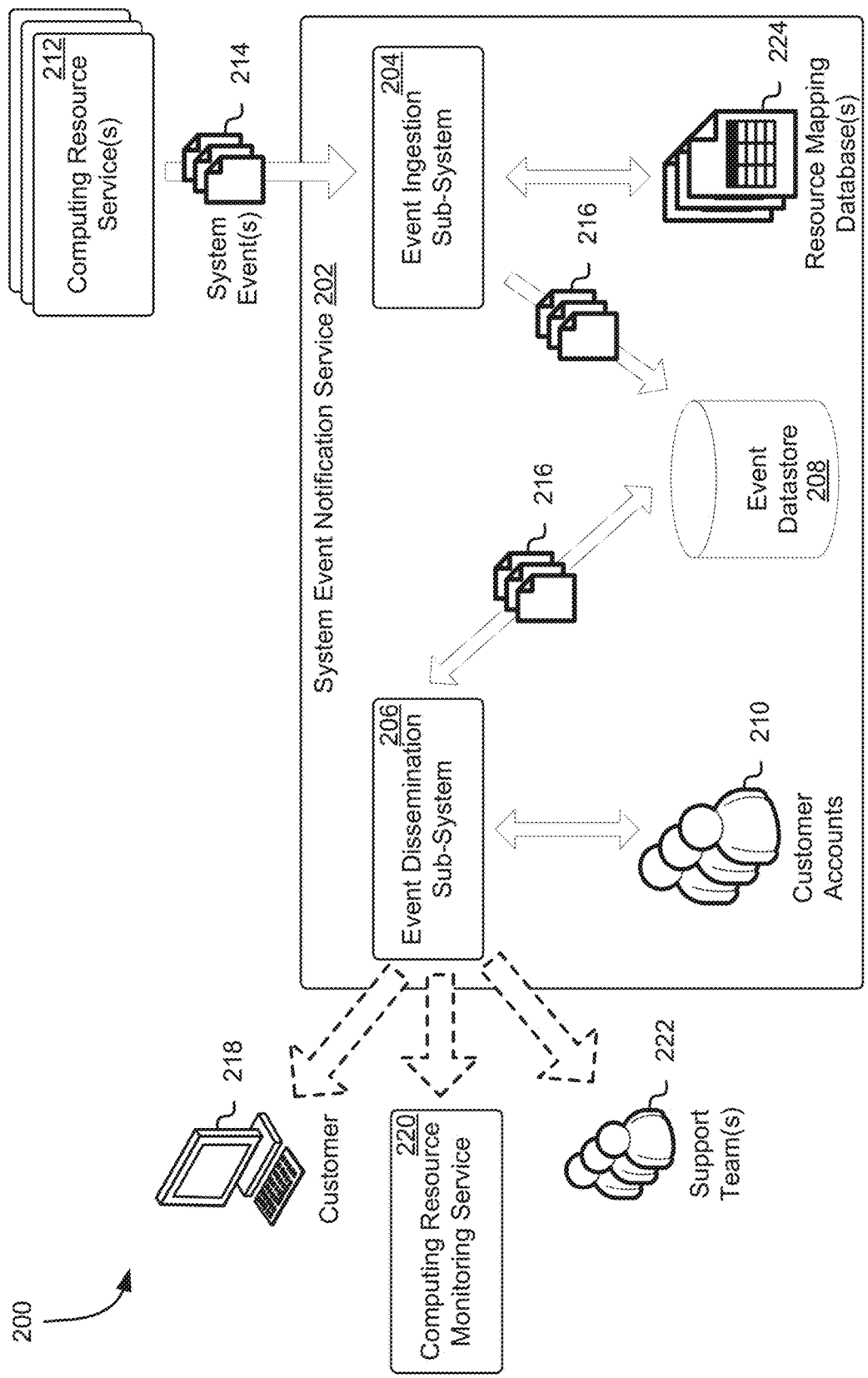
FIG. 2 shows an illustrative example of an environment in which a system event notification service ingests system events from one or more computing resource services for dissemination according to customer preferences in accordance with at least one embodiment.

As noted above, the system event notification service may obtain system event data from one or more computing resource services. This system event data may correspond to infrastructure of a computing resource service impacted by the detected event. The system event notification service may use this data to create customer resource event data for each customer impacted by the detected event. Based at least in part on a customer's preferences, the system event notification service may transmit the customer resource event data to the customer or other designated entity. Alternatively, the system event notification service may store the customer resource event data internally within a datastore. The system event notification service may allow customers and other entities to access the service to request the data from the datastore in order to review the customer resource event data. Accordingly, FIG. 2 shows an illustrative example of an environment 200 in which a system event notification service 202 ingests system event data 214 from one or more computing resource services 212 for dissemination according to customer preferences in accordance with at least one embodiment.

In the environment 200, the system event notification service 202 includes an event ingestion sub-system 204 that obtains system event data 214 from one or more computing resource services 212 of the computing resource service provider. As described above, each computing resource service may include an agent that monitors the infrastructure of the computing resource service to identify any events as they occur. For instance, this agent may monitor the infrastructure of a computing resource service to identify any events and may generate an alarm if an event occurs. Alternatively, a computing resource service may utilize a support team comprising administrators and other authorized entities of the computing resource service that may be tasked to evaluate data from the infrastructure of the service and to monitor this infrastructure to identify potential issues and events. These support teams may also programmatically generate alarms in response to events and publish system event data 214. Thus, a support team may generate the system event data 214, which may be transmitted to the event ingestion sub-system 204 of the system event notification service 202. In some embodiments, a customer can generate its own system event data 214 for its computing resources managed by the one or more computing resource services 212. For instance, a customer can generate billing data for its computing resources in order to bill any other customers that may utilize the customer's computing resources.

The event ingestion sub-system 204 may include one or more computer systems of the system event notification service 202 or an application installed on a computer system of the system event notification service 202 that processes incoming system event data 214 to generate customer resource event data 216 for each impacted customer. For instance, the system event data 214 may include telemetry data, customer data (e.g., customers for whom a resource is provisioned, etc.), resource usage data (e.g., read/write operations per second, etc.), bandwidth data (e.g., input and output data rates, etc.), security data, billing data, and the like. The system event data 214 may also refer to operational events corresponding to the infrastructure of the computing resource services 212 as identified by the one or more computing resource services 212. In some embodiments, the system event data 214 does not identify customers for whom a resource is provisioned or other customer information. If the system event data 214 does not include such information, the event ingestion sub-system 204 may utilize its information about which customers were utilizing the impacted computing resource service to determine the customers impacted by a particular event.

The event ingestion sub-system 204 may evaluate the received system event data 214 to identify the one or more customers whose computing resources are impacted due to the identified event. For instance, the event ingestion sub-system 204 may use the customer data specified in the system event data 214 to identify the one or more customers that may be impacted as a result of the detected event. Further, the event ingestion sub-system 204 may generate the customer resource event data 216 to include, as metadata, a customer identifier corresponding to the customer impacted by the event. The event ingestion sub-system 204 may generate the customer resource event data 216 to further include an event identifier corresponding to the detected event, computing resource service information (e.g., availability region and zone of the computing resource service, an identifier for the computing resource service, etc.), the type of event (e.g., scheduled maintenance, resource failure, resource lag, etc.), start and end time for the event, identifiers for computing resources affected (if any), human-readable event messages, remediation steps if applicable, knowledge base articles corresponding to the event, additional metadata corresponding to the event, and the like. The event ingestion sub-system 204 may store the customer resource event data 216 in an event datastore 208, which may be a repository comprising one or more storage devices for storage of the customer resource event data 216.

In some embodiments, the system event notification service 202 includes one or more resource mapping databases 224 that may provide a mapping of computing resources and the infrastructure of the computing resource services 212 to one another. For example, a computing resource may be associated with another computing resource due to a logical attachment of the computing resources to one another. For instance, the system event notification service 202 may access the customer accounts 210 and the one or more computing resource services 212 to identify each customer's computing resources and the association between these computing resources and other resources of the computing resource services 212. As an illustrative example, a customer's virtual machine instance may be associated (e.g., logically attached) with one or more block-level datastores provided by a block-level data storage service of the computing resource service provider. Thus, if the block-level data storage services suffers a failure resulting in the unavailability of one or more block-level datastores, the event ingestion sub-system 204 may utilize the resource mapping databases 224 to identify the resources associated with the one or more unavailable block-level datastores to determine which customers are impacted by the event. Further, the event ingestion sub-system 204 may utilize the resource mapping databases 224 to identify the applications of the customer that are impacted by an event.

As another illustrative example, a database instance may be associated with a block-level datastore because the block-level datastore stores the data of the database instance according to a schema of the database instance. The customer associated with the database instance may not have visibility into the block-level datastore, as the customer utilizes the database instance, which may include the information needed by the customer. The block-level datastore may support the database instance in through a background process. If the block-level datastore is disabled due to an event, the event ingestion sub-system 204 may utilize the resource mapping databases 224 to identify any resources mapped to block-level datastore, including the database instance.

As yet another example, a computing resource may be association with another computing resource as a result of a computing resource service using the computing resource as part of providing, to a customer, the other computing resource. For instance, a block-level datastore may be associated with a logical data container (e.g., a virtual storage location, which may be implemented as an identifier such that, if a data object is associated with the identifier, it is considered to be within the logical data container). The logical data container may store state information for the block-level datastore. Similarly, the logical data container may be associated with a virtual machine instance as the logical data container may store state information for the virtual machine instance.

The resource mapping databases 224 may further associate various resources based at least in part on tags defined by the customers of the computing resource service provider. For instance, a customer may tag one or more of its computing resources to create a grouping of resources that may be specified in the resource mapping databases 224. Thus, if the event ingestion sub-system 204 identifies an event that impacts a computing resource having the tag defined by the customer, the event ingestion sub-system 204 may generate customer resource event data 216 corresponding to the computing resources that have this particular tag. The event ingestion sub-system 204 may utilize the system event data 214 from the one or more computing resources 212 and utilize the data in the resource mapping databases 224 to aggregate events impacting a customer's resources and utilize event correlation to identify potential root causes for the issues impacting the customer's resources. Thus, the customer resource event data 216 may be generated to provide detailed information regarding the impact of events to the customer's resources.

As an example, a computing resource service may experience multiple, simultaneous events. Instead of providing multiple different notifications relating to these events, the event ingestion sub-system 204 may utilize the data in resource mapping databases 224 to determine how to compile the system event data 214 related to these events to treat the multiple, simultaneous events as a single event. Similarly, the event ingestion sub-system 204 may utilize the system event data 214 related to these events to identify a root cause for the event. For example, the multiple, simultaneous events may be related to a failure of a server rack. The event ingestion sub-system 204 may evaluate the system event data 214 related to these events and identify a correlation among the simultaneous events to identify a server rack failure.

In an embodiment, the resource mapping databases 224 are generated by the system event notification service 202 by obtaining a copy of the internal databases for each computing resource service provided by the computing resource service provider and maintained by each computing resource service. In some examples, the system event notification service 202 may have permissions to query the individual computing resource service databases to ensure that the resource mapping databases 224 have up-to-date information. The computing resource services may also operate a publish/subscription model, whereby the system event notification service 202 may subscribe to subjects corresponding to resources of the customers that utilize the system event notification service 202. In some embodiments, the system event notification service 202 obtains data from databases of the myriad computing resource services and transforms this data into a schema that may be used for aggregation and correlation.

In an embodiment, the system event notification service 202 includes an event dissemination sub-system 206 that obtains the customer resource event data 216 from the event datastore 208 and determines how to disseminate the customer resource event data 216. The event dissemination sub-system 206 may include one or more computer systems of the system event notification service 202 or an application installed on a computer system of the system event notification service 202 that processes the customer resource event data 216 to disseminate the data according to customer preferences. For instance, the event dissemination sub-system 206 may access a customer account 210 corresponding to a customer specified in the customer resource event data 216 to identify a customer's preferences for dissemination of the customer resource event data 216. For instance, a customer may specify that the customer resource event data 216 that the customer resource event data 216 is to be stored in the event datastore 208 and accessible in response to requests to obtain the data. To access the data, the system event notification service 202 may provide to the customer 218 an interface (e.g., GUI) that a customer 218 may access through a browser application installed on a computing device, such as a client device. In order for the customer 218 to interact with the system event notification service 202, the customer 218 may be required to provide credential information for authentication through the GUI, whereby the GUI may utilize the provided credential information to authenticate the customer 218. The system event notification service 202 may utilize the obtained credential information from the GUI to authenticate the customer 218.

If the customer 218 is successfully authenticated by the system event notification service 202, the event dissemination sub-system 206 may update the GUI to present the customer 218 with options to evaluate any customer resource event data 216 that may be available for the customer's computing resources. For instance, the event dissemination sub-system 206 may present, through the GUI, alerts indicating the presence of event data corresponding to the customer's computing resources. The customer 218 may interact with these alerts to cause the GUI to be updated to present detailed event data for the customer's computing resources. Additionally, through the GUI, the customer 218 may view event data for its computing resources according to the event type. In order to update the GUI to present the customer 218 with its customer resource event data 216, the event dissemination sub-system 206 may query the event datastore 208 to identify the customer resource event data 216 for the customer's computing resources. Additionally, the event dissemination sub-system 206 may access the customer account 210 for the customer 218 to identify the customer's preferences for presentation of the customer resource event data 216 through the GUI.

In some embodiments, the system event notification service 202 provides one or more push channels for dissemination of customer resource event data 216 generated by the event ingestion sub-system 204. A customer 218, through its customer account 210, may specify the push channels to be utilized by the event dissemination sub-system 206 to distribute the customer resource event data 216 corresponding to the customer's computing resources. For instance, the customer 218 may provide primary and alternate contact information, which can be used by the event dissemination sub-system 206 to provide the customer resource event data 216 to the customer 218 and/or to other designated entities. For example, if the customer 218 provides one or more e-mail addresses for delivery of the customer resource event data 216, the event dissemination sub-system 206 may generate one or more e-mail messages that can be sent to the corresponding e-mail addresses provided by the customer 218. While e-mail addresses are used extensively throughout the present disclosure for the purpose of illustration, other electronic addresses may be utilized such as Internet Protocol (IP) addresses, Short Message Service (SMS) addresses, Multimedia Message Service (MMS) addresses, social media addresses and identifiers, etc. As another example, the customer 218 may specify in its account 210 that the customer resource event data 216 be used to generate one or more support case files, which the event dissemination sub-system 206 may transmit to one or more support teams 222 designated by the customer 218 to address any events impacting the customer's computing resources.

Through its customer account 210, the customer 218 may also specify that the customer resource event data 216 is to be delivered to a computing resource monitoring service 220 of the computing resource service provider. If the event dissemination sub-system 206 determines, based at least in part on the customer account 210 of the customer 218, that the customer resource event data 216 is to be provided to the computing resource monitoring service 220, the event dissemination sub-system 206 may obtain the customer resource event data 216 from the event datastore 208 and transmit the data to the computing resource monitoring service 220. The computing resource monitoring service 220 may evaluate the data to determine whether to perform the remedial actions as specified by the customer 218. This may include launching one or more software containers that can be tasked with performing the remedial actions based at least in part on the received customer resource event data 216 from the event dissemination sub-system 206.

The customer 218 may further specify, in its customer account 210, other methods for providing the customer resource event data 216 to the customer 218 or to other entities. For instance, the customer 218 may specify that the customer resource event data 216 be transferred to a notification service, which may enable the event dissemination sub-system 206 to send notifications including the customer resource event data 216 to large numbers of recipients or other distributed networks through a communications network. The event dissemination sub-system 206 may publish the notification through a particular topic created using the notification service. In response to the event dissemination sub-system 206 publishing the notification to the topic, the notification may be transmitted to each recipient subscribed to the topic. The event dissemination sub-system 206 may add the notification generated in response to generation of the customer resource event data 216 to this topic, which may cause the notification service to transmit the notification to administrators, other computing resource services that may use the data to perform remedial actions, and other recipients which may be subscribed to this particular topic.

Figure 3:
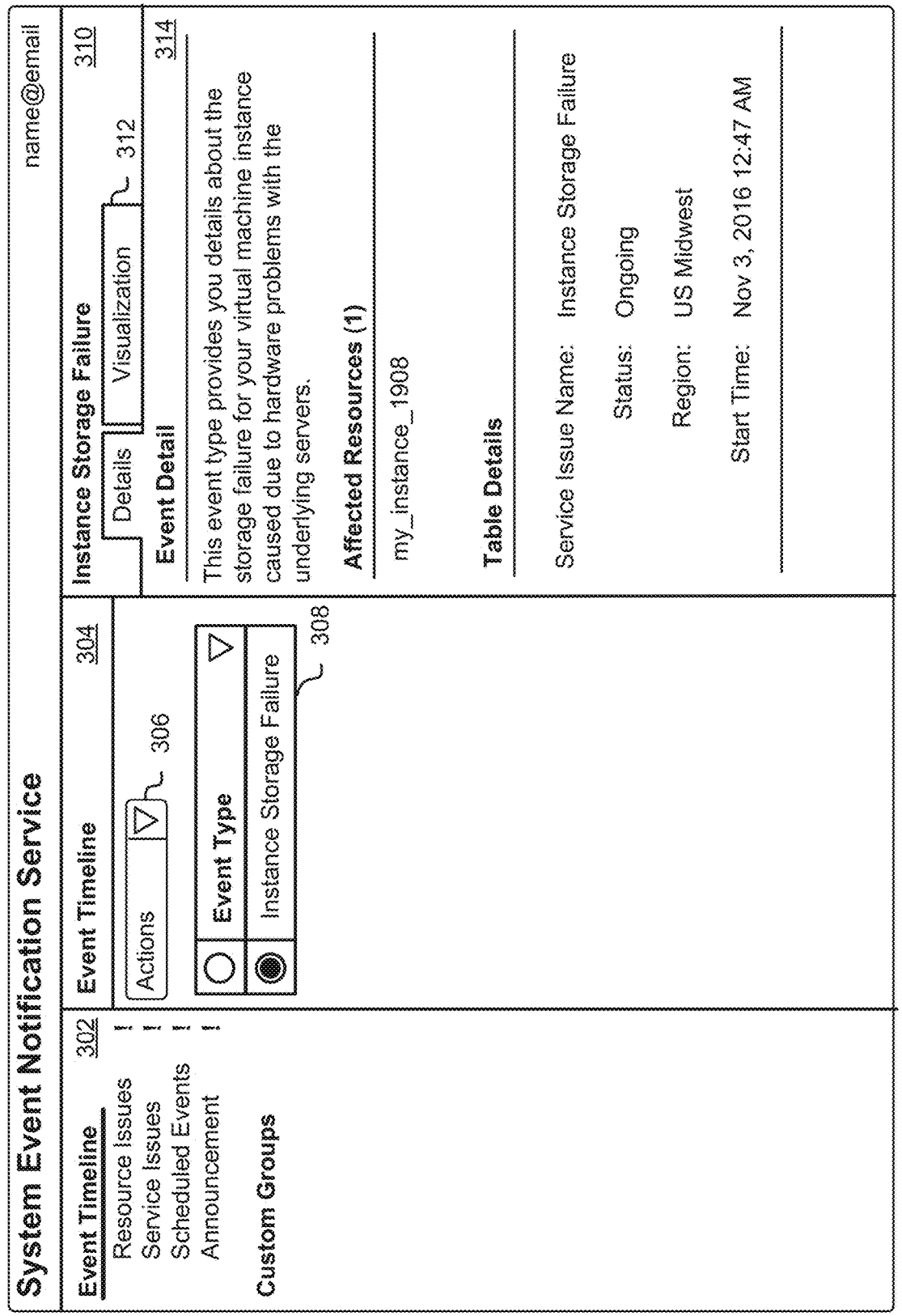
FIG. 3 shows an illustrative example of an interface for reviewing details corresponding to a system event for one or more computing resources in accordance with at least one embodiment.

As noted above, the system event notification service may provide customers and other entities with an interface, such as a GUI, which these customers and other entities may utilize to obtain detailed information regarding different events impacting their computing resources. Accordingly, FIG. 3 shows an illustrative example of an interface 300 for reviewing details corresponding to a system event for one or more computing resources in accordance with at least one embodiment. The interface 300 may include various elements, which a customer or other entity may utilize to review event details for any event that may be impacting one or more of its computing resources. For instance, the interface 300 may include an overview pane 302 that may be used to access an event timeline for events detected by the system event notification service and that may impact the customer's computing resources.

The system event notification service may update the overview pane 302 to specify the types of events encountered by the service that may impact the customer's computing resources. For instance, as illustrated in FIG. 3, the overview pane 302 may present an exclamation point next to each event type if an event of the event type has been detected and potentially impacts the customer's computing resources. While exclamation points are used extensively throughout the present disclosure to denote presence of an event corresponding to a particular event type, other designations may be utilized. For instance, the system event notification service may specify, through the overview pane 302, the number of events for each event type. Thus, the customer or other entity utilizing the interface 300 may identify the number of events detected without having to review the events in detail.

Through the overview pane 302, the customer or other entity may select the event timeline, which may cause the system event notification service to update the interface 300 to present an event timeline pane 304. Through the event timeline 304, the system event notification service may present the customer or other entity with an actions pull-down menu 306, which may be used to give the customer or other entity with one or more actions that may be taken by the system event notification service to address events selected by the customer or other entity. For instance, in an embodiment, the customer or other entity can select, through the actions pull-down menu 306, an option to transmit one or more programmatic scripts that can be executed by the system event notification service to perform remedial actions to resolve the selected events. Alternatively, these one or more programmatic scripts may be transmitted, by the system event notification service, to another service that can execute the one or more programmatic scripts. In another embodiment, the customer or other entity can select, through the actions pull-down menu 306, one or more default actions using programmatic scripts generated by the system event notification service to resolve the selected events. Other actions that may be included within the actions pull-down menu 306 may include accessing best practices guides or how-to guides for addressing the selected events.

The event timeline pane 304 may also include an event type window 308, which the system event notification service may utilize to present the customer or other entity with the events impacting their computing resources. For instance, the system event notification service may present a descriptor of the event through the event type window 308 that the customer or other entity may utilize to determine the type of event encountered. Additionally, the event type window 308 may include, for each event specified, a radio button or other selector that can be used to select the event to be reviewed through the interface 300. Selection of a particular event through the event type window 308 may cause the system event notification service to update the interface 300 to present an event pane 310 for displaying various details corresponding to the selected event.

Through the event pane 310, the system event notification service may present the customer or other entity with various options for reviewing the selected event. For instance, through the event pane 310, the system event notification service may present the customer or other entity with one or more tabs 312 for reviewing details corresponding to the event and for viewing a visualization of the event as the event relates to the customer's computing resources. As illustrated in FIG. 3, the customer or other entity may have selected the details tab. Alternatively, the details tab may be selected by default by the system event notification service. If the details tab is selected, the system event notification service may update the event pane 310 to include an event detail window 314 that may be used to display information regarding the selected event. For instance, the event detail window 314 may be updated to specify a description of the event, the affected computing resources, and other information that may be useful to determine the nature of the event. For instance, as illustrated in FIG. 3, selection of the details tab of the event pane 310 may cause the system event notification service to provide a detailed description of the selected event, the customer's affected resources, and a table comprising details of the selected event, including the event name, the status of the event, the region in which the event occurred, and the time at which the event occurred. This information may provide the customer with information that can be used to determine one or more remedial actions that may be taken to address the event or otherwise reduce the impact of the event to the customer's resources and applications.

Figure 4:
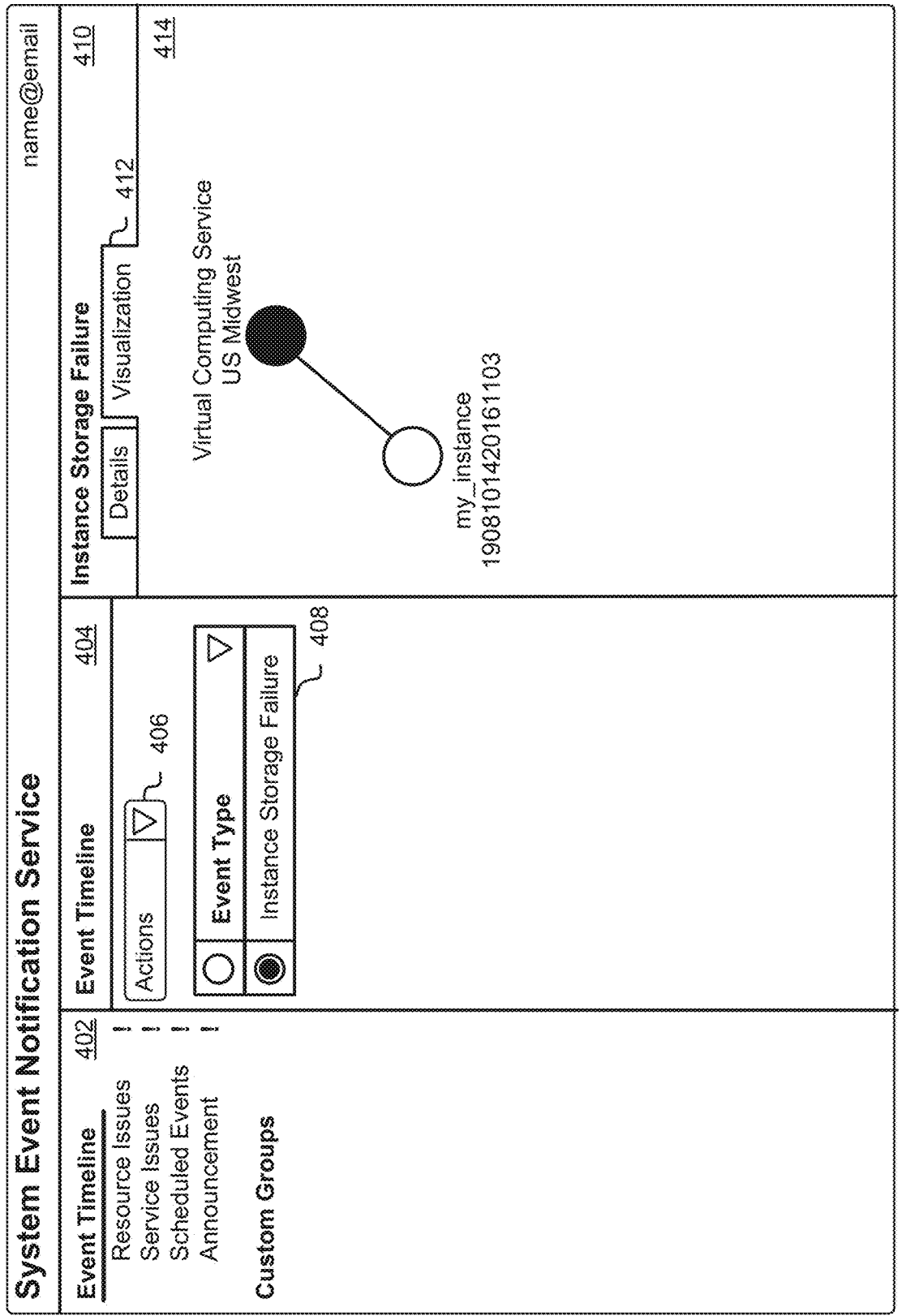
FIG. 4 shows an illustrative example of an interface for reviewing a visualization of a system event for one or more computing resources in accordance with at least one embodiment.

If the customer selects, via the event pane, a visualization tab, the system event notification service may generate a visualization of the event that illustrates the interconnectivity among computing resources and services of the computing resource service provider to demonstrate the impact of the event. Accordingly, FIG. 4 shows an illustrative example of an interface 400 for reviewing a visualization of a system event for one or more computing resources in accordance with at least one embodiment. The interface 400 may be similar to the interface 300 described above in connection with FIG. 3. For instance, the interface 400 may include the aforementioned overview pane 402 and event timeline 404. Additionally, the event timeline pane 404 may include the actions pull-down menu 406 and event type window 408 described above.

Similar to the interface 300 described above, the event pane 410 provided through the interface 400 may include one or more tabs 412 for reviewing details corresponding to the event and for viewing a visualization of the event as the event relates to the customer's computing resources. Through the event pane 410, a customer or other entity may select a visualization tab. Selection of the visualization tab may cause the system event notification service to generate a visualization of the selected event and its impact on the customer's computing resources. The visualization may be presented via an event visualization window 414 of the event pane 410. The system event notification service may present the visualization of the event through use of one or more nodes to describe the interconnectivity among the customer's computing resources impacted by the event and the source of the event. For instance, as illustrated in FIG. 4, if the event is a virtual machine instance storage failure at a virtual computing service, the system event notification service may generate a visualization that includes a node representing the virtual computing service or the impacted storage device. This node may be connected via a line to a node representing the customer's impacted computing resource (e.g., my_instance). In some instances, the system event notification service may label the node corresponding to the origin of the event to differentiate the node from nodes corresponding to resources impacted by the event. For instance, the system event notification service may use a particular color, textual label, icon, and the like to differentiate the node corresponding to the origin of the event from the other nodes. Thus, a customer or other entity may utilize the event visualization window 414 of the event pane 410 to visualize the event, the computing resource or service that is the cause of the event, and the impacted computing resources.

As noted above, the system event notification service may enable customers to create customized groups for monitoring its computing resources. For instance, a customer may create a group in the system event notification service by grouping together an ordering of service regions, computing resource services, tags, and computing resources to denote the customer's applications, projects, cost centers, and the like. The system event notification service may provide, through the interface, a method for customer to generate and modify these groups. Accordingly, FIG. 5 shows an illustrative example of an interface 500 for generating one or more custom groups for aggregating of event data corresponding to computing resources of the one or more custom groups in accordance with at least one embodiment. The interface 500 may be similar to the interfaces described above. For instance, the interface 500 may include the overview pane 502, through which the customer or other entity may select the event timeline for the identified events or the custom group option for creation of a custom group.

If the customer or other selects the custom group option from the overview pane 502, the system event notification service may update the interface 500 to present a custom group creation pane 504 for creation of custom groups. Through the custom group creation pane 504, the system event notification service may provide one or more input fields that a customer or other may utilize to define a custom group. For instance, the system event notification service may present a group name field 506, through which a customer or other entity may define the name of the custom group. If a customer or other entity generates a custom group, the name of the custom group may be presented in the overview pane 502 in conjunction with the custom group option. Thus, through the overview pane 502, the customer or other entity may select the name of a custom group to evaluate any events that may be impacting one or more computing resources or services of the group.

The custom group creation pane 504 may further include an account identifier field 508, which the customer or other entity may utilize to input an account identifier corresponding to a customer's account or other account that is to be monitored. The system event notification service may utilize the account identifier specified in the account identifier field 508 to identify any computing resources associated with the specified account identifier. If there are any computing resources associated with the provided account identifier, the system event notification service may monitor incoming event data from the one or more computing resource services to identify any event data corresponding to the computing resources associated with the account identifier and present the event data to the customer or other entity through the interface 500. In some embodiments, the system event notification service verifies that the customer or other entity is authorized to view event data corresponding to computing resources associated with the provided account identifier in order to enable creation of the custom group.

The system event notification service may include, through the custom group creation pane 504, a data region field 510 that can be used by the customer or other entity to specify a data region of the computing resource service provider. If the customer or other entity specifies a data region within the data region field 510, the system event notification service may evaluate event data from the specified data region that corresponds to the customer's computing resources to generate the customer resource event data that may be presented via the interface 500. Thus, the event details presented via the interface 500 may be specific to the specified data region.

The custom group creation pane 504 may include an event type field 512 through which a customer or other entity may specify the type of events that the customer or other entity is interested in obtaining data for with regard to its resources. If the system event notification service identifies an event impacting the customer's computing resources that matches the specified event type, the system event notification service may present data corresponding to this event to the customer via the interface 500. Any other event types may be omitted from the group.

The customer or other entity may specify, through a resource identifier field 514 presented via the custom group creation pane 504, one or more computing resources that comprise the custom group. If the customer or other entity specifies a resource identifier through the resource identifier field 514, the system event notification service may generate event details corresponding to events that impact the specified computing resource. For instance, if an event impacts a particular service or other computing resource that may impact the specified computing resource, the details regarding this event may be provided to the customer, as well as information as to how the event may impact the specified resource.

The custom group creation pane 504 may further include a tags field 516 through which customers or other entities may specify one or more tags that may be used to identify events and computing resources impacted by these events. As described above, the event data from the one or more computing resource services may include metadata regarding an underlying event. This metadata may specify one or more tags corresponding to the event. If the metadata matches one of the specified tags in the tags field 516, the system event notification service may provide the customer or other entity with details regarding the event and may add resources associated with the event to the group. For example, through the tags field 516, a customer may use a "Production" tag to indicate that the resources to be included in the group are in the production environment. In some embodiments, the tags field 516 can be used to associate one or more computing resources that may have the specified tag into a specific group. Thus, if an event impacts any of the resources having the designated tag, the system event notification service may generate customer resource event data corresponding to the computing resource and to the custom group created by the customer by specifying the tag in the tags field 516. These tags and custom groups may be stored in the resource mapping datastore described above in connection with FIG. 2.

It should be noted that while the system event notification service provides the aforementioned input fields through the custom group creation pane 504, the customer or other entity may not be required to provide input for each field. For instance, a customer or other entity may provide input through a subset of the input fields for generation of a custom group. If the customer or other entity has completed input into one or more of the input fields presented through the custom group creation pane 504, the customer or other entity may select the create group button 518. In response to selection of the create group button 518, the system event notification service may update the account of the customer or other entity to specify the properties of the created group. Further, the system event notification service may monitor incoming event data from the one or more computing resource services to identify event data that is relevant to the custom group. The system event notification service may further include, through the custom group creation pane 504, a cancel button 520, which the customer or other entity may select to exit the custom group creation pane 504 or reset any inputs provided through the input fields.

As noted above, the system event notification service may provide a breakdown of the various events encountered for a customer's computing resources based at least in part on the type of event encountered. For instance, the system event notification service may update the interface provided to its customers to notify the customers as to any events impacting their computing resources and the types of events encountered. If a customer selects a particular event type from the interface, the system event notification service may provide the customer with information regarding the events encountered of the selected event type, as well as a visualization of the impact to the customer's computing resources. Accordingly, FIG. 6 shows an illustrative example of an interface 600 for reviewing event data for computing resources impacted by computing resources issues, service issues, and scheduled events in accordance with at least one embodiment. The interface 600 may be similar to the interfaces described above in connection with FIGS. 3-5. For instance, the interface 600 may include an overview pane 602 that may be used to access an event timeline for events detected by the system event notification service and that may impact the customer's computing resources.

In an embodiment, the system event notification service updates the overview pane 602 to specify the types of events encountered by the service that may impact the customer's computing resources. For instance, as illustrated in FIG. 6, the overview pane 602 may present an exclamation point next to each event type if an event of the event type has been detected and potentially impacts the customer's computing resources. While exclamation points are used extensively throughout the present disclosure to denote presence of an event corresponding to a particular event type, other designations may be utilized. For instance, the system event notification service may specify, through the overview pane 602, the number of events for each event type. Thus, the customer or other entity utilizing the interface 600 may identify the number of events detected without having to review the events in detail.

If a customer or other entity selects a particular event type from the overview pane 602, the system event notification service may update the interface 600 to present an event window 604 that specifies the various events corresponding to the event type selected in the overview pane 602. Through the event window 604, the system event notification service may present the customer or other entity with an actions pull-down menu 608, which may be used to present the customer or other entity with one or more actions that may be taken by the system event notification service to address events selected by the customer or other entity. Through the actions pull-down menu, the customer or other entity may select an option to transmit one or more programmatic scripts that can be executed by the system event notification service to perform remedial actions to resolve the selected events, one or more default actions using programmatic scripts generated by the system event notification service to resolve the selected events, or other actions such as accessing best practices guides or how-to guides for addressing the selected events.

The event window 604 may include one or more tabs 606 for selecting the particular event type to be presented. For instance, if the customer or other entity selects a tab designated for resource issues, the system event notification service may update the event window 604 to present events that have been identified as being resource issues impacting the customer's computing resources. For instance, through the event window 604, the system event notification service may present an event detail window 610, which the system event notification service may utilize to present the customer or other entity with the events impacting their computing resources corresponding to the event type selected. For instance, the system event notification service may present a descriptor of the event through the event detail window 610 that the customer or other entity may utilize to determine the event encountered for the selected event type. Additionally, the event detail window 610 may include, for each event specified, a radio button or other selector that can be used to select the event to be reviewed through the interface 600. Selection of a particular event through the event detail window 610 may cause the system event notification service to update the interface 600 to present a visualization window 612 for displaying a visualization of the impact of the selected event to the customer's computing resources. If the customer or other entity selects one or more of the events, the system event notification service may generate a detailed visualization of the impact of the selected events through the visualization window 612.

The visualization window 612 may be similar to the event visualization window 414 described in FIG. 4. For instance, the system event notification service may present the visualization of the selected events through use of one or more nodes to describe the interconnectivity among the customer's computing resources impacted by the event and the source of the event. The nodes may be connected via lines to other nodes representing the customer's impacted computing resource (e.g., my_instance, etc.). These nodes may represent computing resources that have a particular tag (e.g., my_instance, etc.) associated with them. These computing resources, as illustrated in FIG. 6, may be provided by a virtual computer service via two distinct availability zones (e.g., US Midwest-1 and US Midwest-2). In the first availability zone (e.g., US Midwest-1), there is a single virtual machine instance with the application tag. In the second availability zone (e.g., US Midwest-2), there are two virtual machine instances with the application tag. In some instances, nodes attached to the instances can show other computing resources and their existence and placement in the visualization window 612 may be determined from the resource mapping databases described above. In some instances, the system event notification service may label the node corresponding to the origin of the event to differentiate the node from nodes corresponding to resources impacted by the event. For instance, the system event notification service may use a particular color, textual label, icon, and the like to differentiate the node corresponding to the origin of the event from the other nodes. Thus, a customer or other entity may utilize the visualization window 612 to visualize the one or more selected events and determine the impact to the customer's computing resources and applications that rely on these computing resources. In some embodiments, the visualization window 612 can include a key or legend that may be used to denote what each type of node represented in the visualization window 612 represents. For example, the legend may denote that black nodes represent custom groups or applications, hatched nodes represent computing resource services and availability zones, and white nodes represent customer account and resource names and identifiers.

Figure 7:
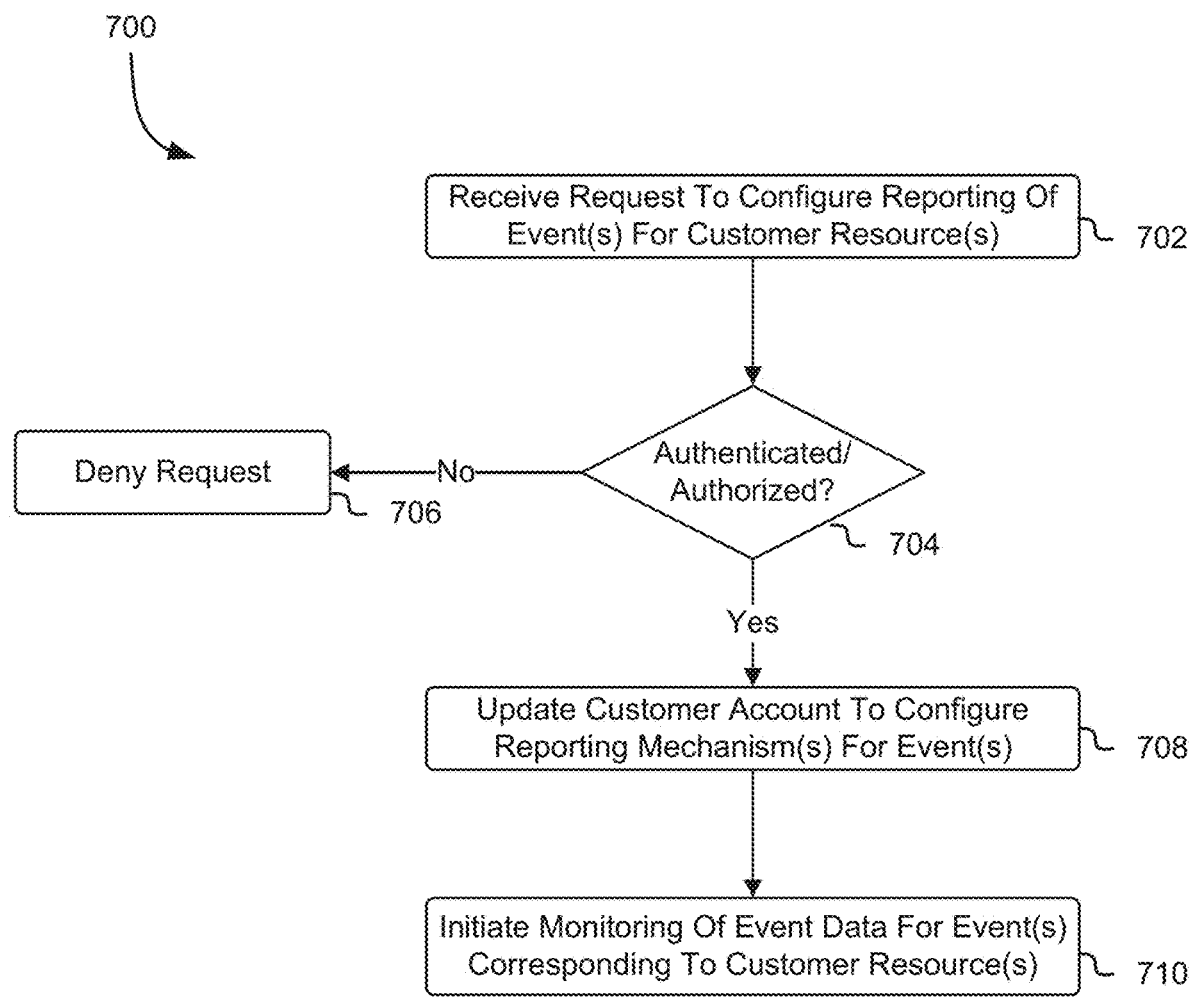
FIG. 7 shows an illustrative example of a process for monitoring of event data from services of a computing resource service provider for event data corresponding to customer computing resources in accordance with at least one embodiment.

As noted above, a customer of the computing resource service provider may transmit a request to the system event notification service to configure reporting of event data for the customer's computing resources maintained by the one or more computing resource services. In response to the request, the system event notification service may generate or update a customer account for the customer to configure one or more reporting mechanisms for the customer resource event data created by the system event notification service. Accordingly, FIG. 7 shows an illustrative example of a process 700 for monitoring of event data from services of a computing resource service provider for event data corresponding to customer computing resources in accordance with at least one embodiment. The process 700 may be performed by the aforementioned system event notification service, which may maintain customer accounts for each customer of the computing resource service provider to enable monitoring of event data based at least in part on the customer's computing resources and its preferences.

At any time, the system event notification service may receive 702 a request from a customer or other entity to configure reporting of any events that have an impact on computing resources of the customer or other entity. In its request, the customer or other entity may specify one or more push channels for dissemination of event data generated by the system event notification service in response to any detected events. For instance, the customer or other entity may provide primary and alternate contact information, which can be used to provide the event data. Alternatively, the customer or other entity may specify in its request that the event data be used to generate one or more support case files, which the system event notification service may transmit to one or more support teams designated by the customer or other entity to address any events impacting the customer's computing resources. In some embodiments, the customer or other entity specifies in its request that reporting of events impacting the customer's computing resources is to be made over one or more pull channels provided by the system event notification service. For instance, customers or other entities may access their event data from the system event notification service through an interface (e.g., GUI) that a customer or other entity may access through a browser application installed on a computing device, such as a client device.

The request from the customer or other entity may be include credential information for authentication and authorization purposes. The credential information may include, among other things, a username, a corresponding password, biometric information, a cryptographic key, a unique identifier, a set of credentials, a hash of the set of credentials, a digital signature generated using a credential, a message authentication code generated based at least in part on a credential, and the like. The system event notification service may utilize the obtained credential information from the request to determine 704 whether the request can be authenticated and, if so, whether the customer or other entity is authorized to configure reporting of events for the customer. For instance, if the request includes a unique user identifier for the customer and a corresponding set of credentials or proof of access to the credentials, the system event notification service may transmit the unique user identifier and the provided credentials or proof of access to the credentials to an authentication service of the computing resource service provider. The authentication service may evaluate the provided information to determine whether the customer can be authenticated. For instance, the authentication service may access a user profile for the customer to obtain information that can be used to verify the provided information. If the authentication service determines that the information provided is valid and corresponds to the customer, the authentication service may authenticate the customer and transmit a notification to the system event notification service to indicate that the client has been successfully authenticated.

If the customer cannot be authenticated or is not authorized to configure reporting of events for one or more computing resources, the system event notification service may deny 706 the request. However, if the customer has been successfully authenticated and is authorized to configure reporting of events for one or more computing resources, the system event notification service may update 708 the customer account specified in the request to configure the one or more specified reporting mechanisms for events impacting the customer's computing resources. For instance, the system event notification service may access a customer account corresponding to a customer specified in customer resource event data to identify a customer's preferences for dissemination of the customer resource event data. Thus, the system event notification service may utilize the customer account to identify the customer's preferred reporting mechanisms and utilize these reporting mechanisms to provide any event data corresponding to events impacting the customer's computing resources.

The system event notification service may initiate 710 monitoring of incoming event data from the one or more computing resource services to identify any events that may be impacting the customer's computing resources. For instance, the system event data from the one or more computing resource services may include telemetry data, customer data (e.g., customers for whom a resource is provisioned, etc.), resource usage data (e.g., read/write operations per second, etc.), bandwidth data (e.g., input and output data rates, etc.), and the like. The system event data may also refer to operational events corresponding to computing resources of the computing resource services as identified by the one or more computing resource services. As will be described in greater detail below, the system event notification service may utilize the customer data specified in the system event data to determine whether an event impacts the customer's computing resources.

Figure 8:
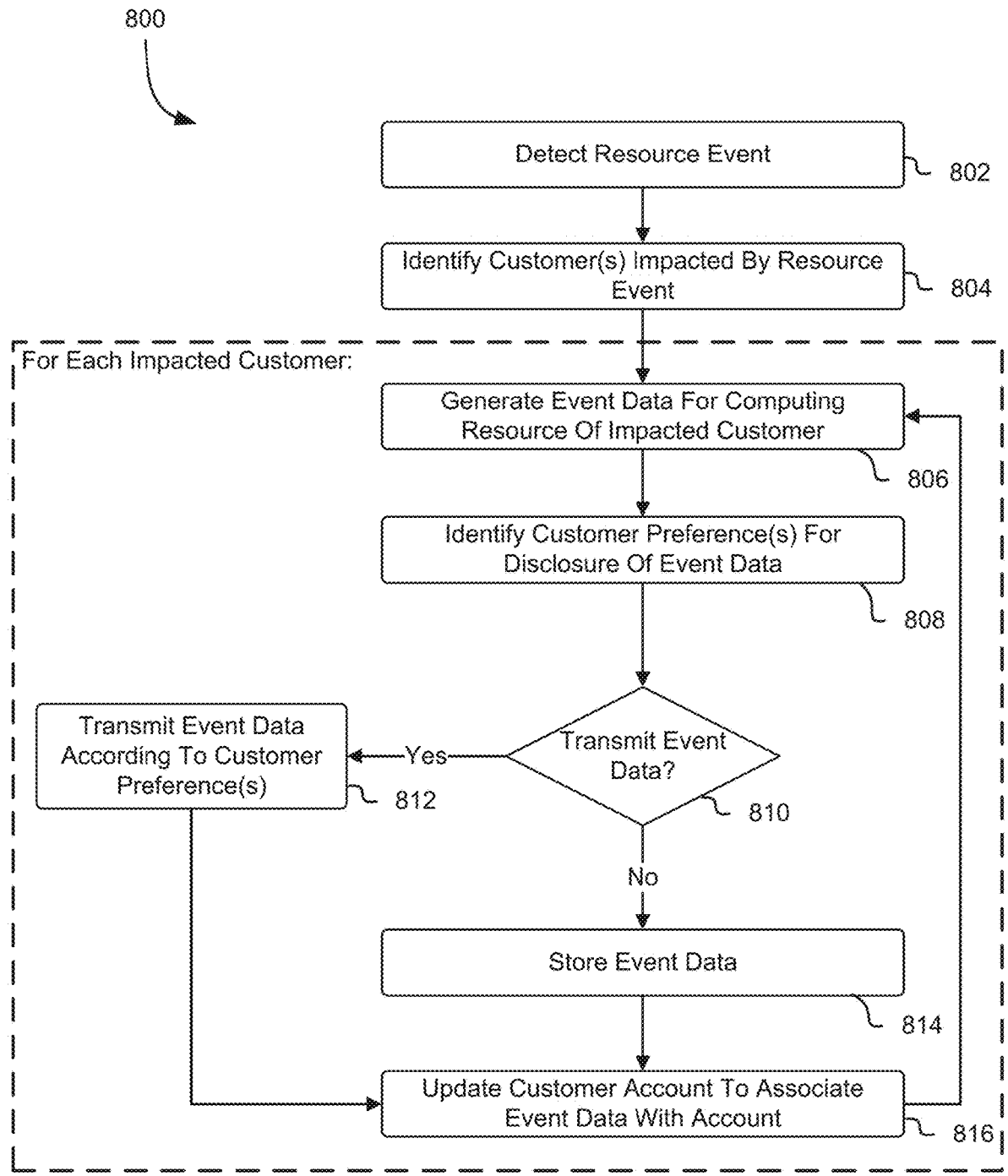
FIG. 8 shows an illustrative example of a process for making event data for computing resources available to impacted customers in response to detection of an event impacting various computing resources in accordance with at least one embodiment.

As noted above, the system event notification service may evaluate event data from the one or more computing resources to determine the impact of any identified event on a customer's computing resources. Additionally, in some embodiments, the system event notification service can detect any events through monitoring of the one or more services and the underlying computing resources of these one or more services. The system event notification service may generate its own event data if an event is detected. Based at least in part on a customer's preferences, the system event notification service may transmit event data to one or more entities or store the event data to make it available to the customer or other entities through the service. Accordingly, FIG. 8 shows an illustrative example of a process 800 for making event data for computing resources available to impacted customers in response to detection of an event impacting various computing resources in accordance with at least one embodiment. The process 800 may be performed by the aforementioned system event notification service.

In an embodiment, the system event notification service detects 802 an event impacting the infrastructure of one or more computing resource services. To detect this event, the system event notification service may receive event data from one or more computing resource services of the computing resource service provider indicating occurrence of an event. For instance, each computing resource service may include an agent that monitors the infrastructure of the computing resource service to identify any events as they occur. These agents may be software applications configured to run in each computing resource service and may act as an interface between their respective computing resource service and other services and entities, such as the system event notification service. Alternatively, a computing resource service may utilize a support team comprising administrators and other authorized entities of the computing resource service that may be tasked to evaluate data from computing resources and the infrastructure of the service to identify potential issues and events. The support team may generate the system event data, which may be transmitted to the system event monitoring service.

The system event data from the one or more computing resource services may include telemetry data, customer data (e.g., customers for whom a resource is provisioned, etc.), resource usage data (e.g., read/write operations per second, etc.), bandwidth data (e.g., input and output data rates, etc.), and the like. The system event data may also refer to operational events corresponding to the infrastructure of the computing resource services as identified by the one or more computing resource services. In some embodiments, the system event notification service monitors the one or more computing resource services to identify any events that may impact customers' computing resources. For instance, if the system event notification service determines that a particular server of a computing resource service has been rendered inoperable or is offline, the system event notification service may identify, based at least in part on the configuration of the computing resource service and customer accounts, the impacted computing resources and customers. The system event notification service may also generate its own system event data corresponding to the event. In an embodiment, the system event notification service determines a compilation (e.g., ordering, list, etc.) of computing resources that are impacted by the detected event. This compilation may be determined based at least in part on the system event data from the one or more computing resource services or generated by the system event notification service in response to the event. For instance, the system event notification service may evaluate the event data corresponding to the detected event to identify one or more identifiers for the resources impacted by the event. Additionally, the system event notification service may access the resource mapping databases to identify the one or more mappings for resources stemming from the resources immediately impacted by the event. Using these mappings from the databases, the system event notification service may identify any other resources that may be collaterally impacted by the event to determine the compilation of resources impacted by the detected event.

For example, a customer's virtual machine instance may be associated (e.g., logically attached) with one or more block-level datastores provided by a block-level data storage service of the computing resource service provider. Thus, if the block-level data storage services suffers a failure resulting in the unavailability of one or more block-level datastores, the event ingestion sub-system may utilize the resource mapping databases to identify the resources associated with the one or more unavailable block-level datastores to determine which customers are impacted by the event. Further, the event ingestion sub-system may utilize the resource mapping databases to identify the applications of the customer that are impacted by an event.

The system event notification service may utilize the received system event data or its evaluation of the configuration of the impacted services to identify 804 the one or more customers impacted by the event. As described above, the system event data from the one or more computing resource services may include customer data. This customer data may include identifiers for each customer for whom the corresponding computing resources have been provisioned. In some instances, the system event notification service may access an identity management service of the computing resource service provider to identify the customers impacted by the event. For instance, the system event notification service may include in a query to the identity management service identifiers for the impacted computing resources. In response to the query, the identity management service may provide customer identifiers corresponding to the customers for whom the computing resources were provisioned. In some embodiments, the system event notification service utilizes the event data corresponding to the infrastructure impacted by the event to determine a compilation of customer accounts associated with computing resources associated with the infrastructure. For instance, the system event notification service may access the resource mapping databases to identify the customers associated with the computing resources impacted by the event. This may include identifying resources associated with the impacted infrastructure and using the resource mapping databases to identify any resources associated with the impacted resources to identify a mapping of resources. This mapping of resources may be used to determine the compilation of the customer accounts associated with the impacted resources. In this manner, the system event notification service may provide granular notifications to those customers impacted by an event, which may obviate the need to post information about the event publicly.

In another example, different components of infrastructure may have respective identifiers and a database may associate, either directly or indirectly, infrastructure components with customers having at least one resource supported by that infrastructure component. The system event data may specify an identifier of an infrastructure component (e.g., server rack) and that identifier may be used to query the database to obtain information about the customer account(s) whose resource(s) utilize that infrastructure component. As one example, an identifier of a rack may be used to query the database to obtain a list of virtual computer system instances supported by servers in the rack. The list of virtual computer system instances may be used to submit one or more additional queries to obtain a list of customer accounts corresponding to the virtual computer system instances in the list. In another example, the database schema directly associates the customer accounts with the rack identifier so that a query using the rack identifier results in query results that identify the customer accounts. Depending on what component of the infrastructure is affected and the schema(s) of the database(s) used, the number of queries to obtain information about which customer account(s) are affected by an event affecting infrastructure may vary in accordance with various embodiments. For instance, an event affecting a network appliance may trigger a query with an identifier of the power supply to determine a set of server racks whose network traffic depends on operation of the network appliance. Identifiers of the racks in the set may be used for additional queries to obtain more fine-grained information. Other examples are also within the scope of the present disclosure.

In an embodiment, for each impacted customer identified by the system event notification service or specified in the compilation of the plurality of customer accounts, the system event notification service generates 806 event data for the one or more computing resources of the customer impacted by the event. This event data may include an event identifier corresponding to the detected event, computing resource service information (e.g., availability region and zone of the computing resource service, an identifier for the computing resource service, etc.), the type of event (e.g., scheduled maintenance, resource failure, resource lag, etc.), start and end time for the event, identifiers for computing resources affected (if any), human-readable event messages, remediation steps if applicable, knowledge base articles corresponding to the event, additional metadata corresponding to the event, and the like. Additionally, the system event notification data may determine which, if any, tags are associated with the affected computing resources. This may be used for the aggregation of event data for the customer. The system event notification service may also identify 808 the customer's preferences for disclosure of the event data. For instance, a customer may specify one or more push channels for delivery of the event data to the customer, one or more support teams, a computing resource monitoring service for performance of remedial operations, and other entities. Alternatively, a customer may specify that the event data is to be stored by the system event notification service and accessible via one or more pull channels, such as through an interface provided by the service that a customer or other entity may utilize to request the data.

Based at least in part on the customer's preferences specified in the customer's account, the system event notification service may determine 810 whether to transmit the event data through one or more push channels. For instance, the customer may provide one or more e-mail addresses for delivery of the customer resource event data, which may cause the system event notification service to generate, based at least in part on the generated customer resource event data, one or more e-mail messages that can be sent to the corresponding e-mail addresses provided by the customer. As another example, the customer may request that the customer resource event data be used to generate one or more support case files, which the system event notification service may transmit to one or more support teams designated by the customer to address any events impacting the customer's computing resources. In an embodiment, the customer can specify, in the customer's account that the customer resource event data is to be delivered to a computing resource monitoring service, which may be responsible for collecting computing resource data corresponding to computing resources of the one or more computing resource services. This information may be used for a variety of different purposes, for example, determining whether perform one or more remedial actions to address any issues impacting performance of computing resources of the computing resource services. The customer may further specify, in its request to the system event notification service, other methods for pushing the customer resource event data to the customer or to other entities. For instance, the customer may request that the customer resource event data be transferred to a notification service, which may enable the system event notification service to send notifications including the customer resource event data to large numbers of recipients or other distributed networks through a communications network. If the system event notification service determines that the event data is to be transmitted over one or more push channels, the service may transmit 812 the event data according to the customer's preferences.

Alternatively, if the system event notification service determines that the event data is not to be transmitted via one or more push channels (e.g., the customer preferences indicate availability of event data only through pull channels, etc.), the system event notification service may store 814 the event data within an event datastore of the system event notification service. Further, the system event notification service may update 816 the corresponding customer account to associate the generated event data with the account. Thus, if a customer or other entity submits a request to the service to obtain the event data, the system event notification service may access the customer account and determine the storage location of the event data within the event datastore.

Figure 9:
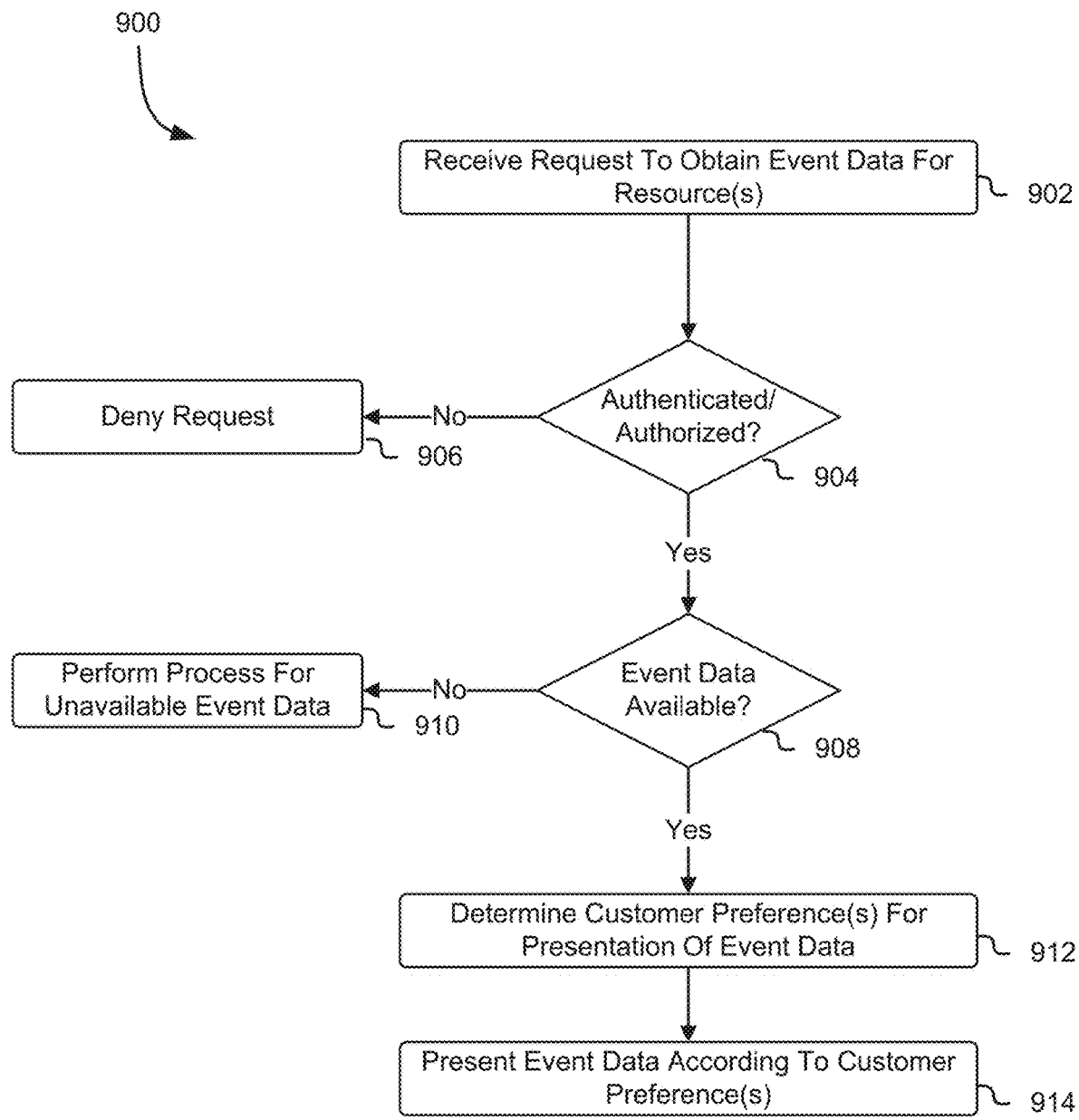
FIG. 9 shows an illustrative example of a process for providing event data for one or more computing resources in response to a request to obtain event data for the one or more computing resources in accordance with at least one embodiment.

As noted above, a customer of the computing resource service provider may transmit a request to the system event notification service to obtain event data for one or more computing resources impacted by an event identified by the service. In response to the request, the system event notification service may obtain any available event data from the event datastore. Further, the system event notification service may identify one or more customer preferences for presentation of the event data to the customer. Accordingly, FIG. 9 shows an illustrative example of a process 900 for providing event data for one or more computing resources in response to a request to obtain event data for the one or more computing resources in accordance with at least one embodiment. The process 900 may be performed by the aforementioned system event notification service, which may process incoming requests for presentation of event data corresponding to computing resources impacted by events encountered by the one or more services of the computing resource service provider.

At any time, the system event notification service may receive 902 a request from a customer or other entity to obtain event data for one or more computing resources. For instance, the system event notification service may provide to the customer or other entity an interface that the customer or other entity may access through a browser application installed on a computing device, such as a client device. In order for the customer to interact with the system event notification service, the customer or other entity may provide credential information for authentication through the GUI. The credential information may include, among other things, a username, a corresponding password, biometric information, a cryptographic key, a unique identifier, a set of credentials, a hash of the set of credentials, a digital signature generated using a credential, a message authentication code generated based at least in part on a credential, and the like.

The system event notification service may utilize the obtained credential information from the GUI to determine 904 whether the request can be authenticated and whether the customer or entity is authorized to obtain the requested event data. For instance, if the request includes a unique user identifier for the customer and a corresponding set of credentials or proof of access to the credentials, the system event notification service may transmit the unique user identifier and the provided credentials or proof of access to the credentials to an authentication service of the computing resource service provider. The authentication service may evaluate the provided information to determine whether the customer can be authenticated. For instance, the authentication service may access a user profile for the customer to obtain information that can be used to verify the provided information. If the authentication service determines that the information provided is valid and corresponds to the customer, the authentication service may authenticate the customer and transmit a notification to the system event notification service to indicate that the client has been successfully authenticated. If the customer or other entity cannot be authenticated or is not authorized to access the requested event data, the system event notification service may deny 906 the request.

If the customer or other entity is successfully authenticated and the system event notification service determines that the customer or other entity is authorized to access the event data for the specified computing resources, the system event notification service may determine 908 whether there is event data available for the specified computing resources. For instance, the system event notification service may query an event datastore to identify one or more customer resource event data files stored therein that can be used to fulfill the request. Alternatively, if the customer has not specified a specific set of computing resources for which event data is to be obtained, the system event notification service may access the customer's account to identify its computing resources and determine whether any event data is available for these computing resources. If no event data is available, the system event notification service may perform 910 a process for the event in which there is no available event data. For instance, the system event notification service may transmit a notification to the customer or other entity to indicate that no event data is available. Alternatively, the system event notification service may deny the request.

If the system event notification service determines that there is event data available for the specified computing resources, the system event notification service may access the customer's account to determine 912 one or more customer preferences for presentation of the requested event data. For instance, the system event notification service may enable customers to create customized groups for monitoring computing resources. A customer may create a group in the system event notification service by grouping together an ordering of service regions, computing resource services, tags, and computing resources to denote the customer's applications, projects, cost centers, and the like. These group definitions may be matched with every event published by the one or more computing resource services. If a match is identified by the system event notification service, the event data corresponding to the event is appended to include metadata comprising the group name, resource tags, and the like. This may provide specificity of impact to the computing resources to the customer. Alternatively, in the customer account, a customer or other entity may specify one or more push channels for delivery of the event data, as described above. The customer may also specify, through its customer preferences, any localization preferences (e.g., language, currency, unit system, etc.) that may be used by the system event notification service to present the event data. Additionally, the customer may specify, through its customer preferences, any preferences for presentation of the event data, including presenting any tags associated with the computing resources of the customer. Based at least in part on the customer's preferences, the system event notification service may present 914 the event data such as through presentation of a visualization of the event data corresponding to a group, presentation of detailed information regarding the event, and the like.

Figure 10:
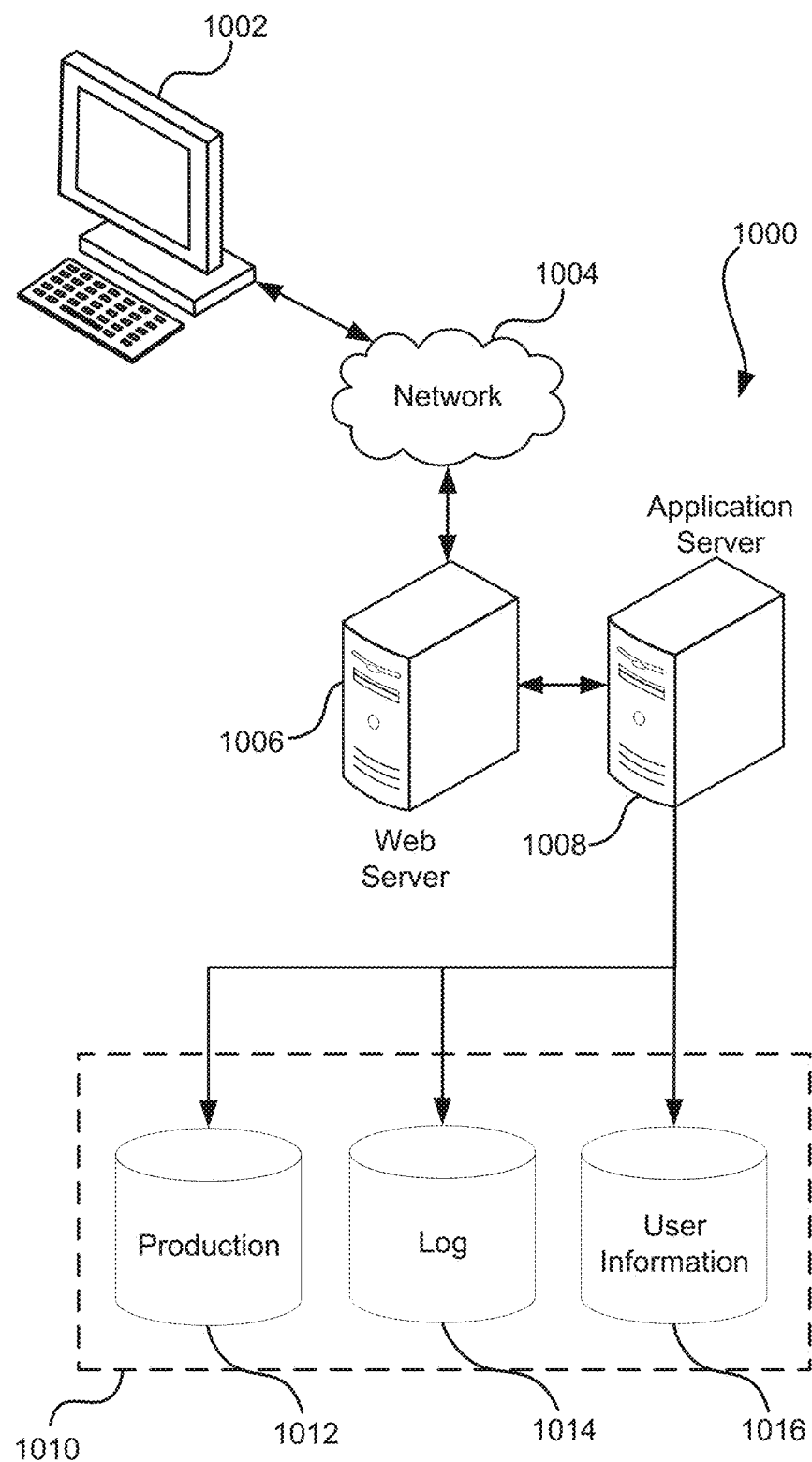
FIG. 10 shows an illustrative example of an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes, and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. The application server 1008 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as My SQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving an indication of an event that impacts an infrastructure of a computing resource service that is used to operate the computing resource service;
determining a compilation of computing resources impacted by the event, the compilation of computing resources being supported by the infrastructure of the computing resource service;
determining a compilation of customer accounts associated with the compilation of computing resources based at least in part on a resource map included in a database, the resource map including a mapping of the computing resources, the infrastructure of the computing resource service, and the compilation of customer accounts; and
for a first customer account of the compilation of customer accounts:
generating event data for the first customer account for a set of computing resources, of the plurality of computing resources, associated with the first customer account;
identifying one or more preferences associated with the first customer account for dissemination of the event data, where a first preference of the one or more preferences indicates an event type for which to provide event data in response to, where the event that impacts infrastructure of the computing resource service is of the event type, and a second preference of the one or more preferences indicates a presentation of the event data;
disseminating the event data according to at least the first preference and the second preference;

receiving a request for additional event data based at least in part on the event data; and in response to the request, transmitting a notification to a client device associated with the first customer account that no additional event data is available based at least in part on information associated with the set of computing resources.

2. The computer-implemented method of claim 1, wherein receiving the indication of the event includes receiving, from the computing resource service, system event data indicating occurrence of the event, the system event data usable to determine the compilation of computing resources impacted by the event.

3. The computer-implemented method of claim 1, wherein disseminating the event data further includes transmitting the event data to a computing resource monitoring service operated by the computing resource service such that, in response to receiving the event data, the computing resource monitoring service performs one or more remedial actions to address the event.

4. The computer-implemented method of claim 1, wherein disseminating the event data further includes transmitting data to the client device, that as a result of being received by the client device, causes an interface displayed on the client device to be updated to present the event data in accordance with the second preference.

5. A system, comprising:
one or more processors; and
memory including instructions that, as a result of being executed by the one or more processors, cause the system to:
detect an event that impacts infrastructure of a computing resource service;
determine a customer account associated with a set of computing resources supported by the infrastructure based at least in part on a resource map included in a database, the resource map including a mapping of a set of computing resources supported by the infrastructure to the customer account;
generate event data for the customer account based at least in part on a set of preferences associated with the customer account, where a first preference of the set of preferences defines an event type and a second preference of the set of preferences defines presentation information for displaying the event data in a user interface;
provide the event data according to the set of preferences associated with the customer account;
receive a request for additional event data associated with the customer account; and
transmit a response indicating that additional event data is not available based at least in part on information obtained from the computing resource service.

6. The system of claim 5, wherein the instructions that cause the system to provide the event data according to the set of preferences further cause the system to transmit the event data to a computing resource monitoring service to cause the computing resource monitoring service to launch one or more software containers to perform one or more remedial actions to address the event.

7. The system of claim 5, wherein the instructions that cause the system to determine the customer account associated with the set of computing resources supported by the infrastructure further cause the system to:
determine a compilation of computing resources supported by the infrastructure; and identify the customer account based at least in part on the compilation of computing resources.

8. The system of claim 5, wherein:
the set of preferences specifies one or more support teams for performing remedial actions to address the event; and
the instructions that cause the system to provide the event data according to the set of preferences further cause the system to:
generate, using the event data, one or more case files; and
transmit the one or more case files to the one or more support teams.

9. The system of claim 5, wherein the instructions that cause the system to detect the event further cause the system to:
receive, from the computing resource service, system event data corresponding to the event; and
utilize the system event data to generate the event data for the customer account.

10. The system of claim 5, wherein the instructions further cause the system to transmit data to a client device of a user of the customer account to cause the client device to update an interface displayed on the client device to provide the event data.

11. The system of claim 5, wherein the instructions further cause the system to:
receive, from an entity associated with the customer account, a request to obtain the event data;
determine that the entity is authorized to obtain the event data; and
provide the event data to fulfill the request.

12. The system of claim 5, wherein the instructions further cause the system to publish the event data to a topic of a notification service to cause the notification service to transmit the event data to subscribers of the topic.

13. A non-transitory computer-readable storage medium storing thereon executable instructions that, as a result of being executed by one or more processors of a computer system, cause the computer system to at least:
identify an event that impacts infrastructure of a computing resource service of a computing resource service provider;
determine a compilation of computing resources impacted by the event based at least in part on a resource map, the resource map including a mapping of the infrastructure of the computing resource service of the computing resource service provider, the compilation of computing resources, and at least one account associated with the compilation of computing resources;
generate event data for the at least one account associated with the compilation of computing resources;
provide the event data according to one or more preferences specified in the at least one account, where a first preference of the one or more preferences defines an event type associated with the event, and a second preference of the one or more preferences defines presentation of the event data; and
provide an indication that no additional event data has been generated based at least in part on additional data obtained from the computing resource service provider.

14. The non-transitory computer-readable storage medium of claim 13, wherein the instructions further cause the computer system to:
receive a request to obtain the event data;
determine that the request originated from an entity that is authorized to obtain the event data; and
provide the event data.

15. The non-transitory computer-readable storage medium of claim 13, wherein the instructions further cause the computer system to transmit the event data to a notification service to publish the event data to a topic, whereby the notification service transmits the event data to one or more subscribers of the topic.

16. The non-transitory computer-readable storage medium of claim 13, wherein:
the one or more preferences specify one or more electronic addresses corresponding to recipients specified in the at least one account; and
the instructions further cause the computer system to transmit the event data to the one or more electronic addresses.

17. The non-transitory computer-readable storage medium of claim 13, wherein the instructions further cause the computer system to transmit data to a client device associated with the at least one account to cause the client device to update an interface displayed on the client device in accordance with the one or more preferences to provide the event data.

18. The non-transitory computer-readable storage medium of claim 13, wherein the instructions further cause the computer system to cause one or more software containers to be launched to perform one or more remedial actions to address the event.

19. The non-transitory computer-readable storage medium of claim 13, wherein the instructions further cause the computer system to:
in response to identifying the event, obtain, from the computing resource service, system event data corresponding to the event; and
generate, based at least in part on the system event data, the event data for the at least one account.

20. The non-transitory computer-readable storage medium of claim 13, wherein the instructions further cause the computer system to:
generate, based at least in part on the event data, one or more case files;
identify, from the at least one account, one or more support teams for delivery of the one or more case files; and
transmit the one or more case files to the one or more support teams.

* * * * *